(12) United States Patent
Baldwin et al.

(10) Patent No.: US 7,695,170 B1
(45) Date of Patent: Apr. 13, 2010

(54) OUTDOOR SWIVEL HEAD SPOTLIGHT

(75) Inventors: Jeffrey P. Baldwin, Phoenix, AZ (US); Richard L. Cleghorn, Tempe, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

(21) Appl. No.: 12/163,740

(22) Filed: Jun. 27, 2008

Related U.S. Application Data

(60) Provisional application No. 60/946,546, filed on Jun. 27, 2007.

(51) Int. Cl.
*B60Q 1/06* (2006.01)

(52) U.S. Cl. .................. 362/371; 362/269; 362/287; 362/421; 362/427; 248/288.51

(58) Field of Classification Search ............ 362/269, 362/282, 287, 322, 359, 371, 421, 427; 248/288.31, 248/288.51; 403/122
See application file for complete search history.

(56) References Cited

U.S. PATENT DOCUMENTS 3,278,203 A * 10/1966 Snyder .................. 362/421
4,357,651 A * 11/1982 Mayer .................. 362/421
4,974,802 A * 12/1990 Hendren ............... 248/288.51

* cited by examiner

*Primary Examiner*—Stephen F Husar
(74) *Attorney, Agent, or Firm*—Booth Udall, PLC

(57) ABSTRACT

An outdoor swivel head spotlight is described. A light bulb hood comprises a reflector and base. The base comprises a spherical socket having an internal seat. A support arm comprising a spherical end and a distal end connected to the spherical end by a through conduit is provided. The spherical end is seated in the internal seat. An internally threaded nut comprising an inwardly projecting lip having an open interior diameter at least as large as the external diameter of the spherical end, is coupled with the spherical socket. A washer between the spherical end and the lip of the nut is provided. When the nut is in a loosened position, the hood may be positioned to a desired angular position and when the nut is in a tightened position, the washer presses the spherical end into the internal seat to fix the angular position of the light hood.

9 Claims, 3 Drawing Sheets

OUTDOOR SWIVEL HEAD SPOTLIGHT

CROSS REFERENCE TO RELATED APPLICATIONS

This document claims the benefit of the filing date of U.S. Provisional Patent Application 60/946,546 to Shotey, et al. entitled "Swivel Head Lighting Fixture," which was filed on Jun. 27, 2007, the disclosure of which is hereby incorporated herein by reference.

BACKGROUND

1. Technical Field

Aspects of this document relate generally to outdoor spotlights having swivel heads.

2. Background Art

Outdoor spotlights are commonly used in many residential, commercial and industrial applications in order to provide illumination where desired. Outdoor spotlights are desirably weatherproof and resist water entry into the housing. Conventional outdoor spotlights having a light bulb hood may require multiple adjustments of a light bulb hood in order to adjust the direction of the light bulb hood separately in multiple axes.

SUMMARY

In one aspect, an outdoor swivel head spotlight may comprise a light bulb hood comprising a reflector and a base, the base comprising an externally threaded spherical socket having an internal seat, at least a portion of which is complementary to a sphere. The assembly comprises a support arm comprising a spherical end having an external diameter and a distal end connected to the spherical end by a through conduit extending through the spherical end, the spherical end seated in the internal seat of the externally threaded spherical socket. An internally threaded nut comprising an inwardly projecting lip having an open interior diameter at least as large as the external diameter of the spherical end, the internally threaded nut threadably coupled with the externally threaded spherical socket is coupled to the externally threaded spherical socket. A washer is placed between the spherical end of the support arm and the inwardly projecting lip of the nut. When the nut is in a loosened position, the light bulb hood may be positioned to a desired angular position and when the nut is in a tightened position, the washer presses the spherical end into the internal seat to fix the angular position of the light bulb hood with respect to the support arm.

Particular implementations of outdoor swivel head spotlights may include one or more of the following. The nut may comprise a grip on an outside surface of the nut. The distal end of the support arm may be externally threaded and sized as a ½ inch coupling or a ¾ inch coupling. The washer may be a compression washer.

In another aspect, a method of assembling an outdoor swivel head spotlight may comprise passing an inwardly projecting lip of an internally threaded nut over an external spherical diameter of a spherical end of a support arm, passing a washer over the external spherical diameter of the spherical end of the support arm, and threadably coupling the internally threaded nut with an externally threaded spherical socket such that the spherical end of the support arm seats in the spherical socket and the washer is positioned between the spherical end of the support arm and the inwardly projecting lip of the nut.

Particular implementations of a method of assembling outdoor swivel head spotlights may include one or more of the following additional steps: Tightening the threaded coupling of the nut with the spherical socket and compressing the washer between the lip and the spherical end of the support arm; and providing a weatherproof seal by compressing the washer.

In still another aspect, a method of adjusting an outdoor swivel head spotlight may comprise loosening an internally threaded nut with respect to an externally threaded spherical socket, adjusting a light bulb hood so that the light bulb hood is in a desired orientation, tightening the nut with respect to the externally threaded spherical socket, and fixing the multi-axis angular position of the light bulb hood with respect to the support arm by compressing a washer between an inwardly projecting lip of the nut and spherical end of support arm seated in the spherical socket.

Particular implementations of swivel head lighting fixtures may include one or more of the following. Compressing the washer may comprise providing a weatherproof seal.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Outdoor spotlights comprising a swivel head will hereinafter be described in conjunction with the appended drawings, where like designations denote like elements, and.

DESCRIPTION

This document features an outdoor spotlight having a swivel head. There are many features of a outdoor swivel head spotlight disclosed herein, of which one, a plurality, or all features may be used in any particular implementation.

Whether an outdoor spotlight is used in a residential, commercial, or industrial applications, the ability adjust a light bulb hood along multiple axes and to fix a light bulb hood in a desired orientation by loosening and tightening only a single nut is helpful to many users of outdoor lighting fixtures. In addition, the ability to simplify the manufacture of outdoor lighting is helpful to many manufacturers of outdoor lighting fixtures.

Figure 1:
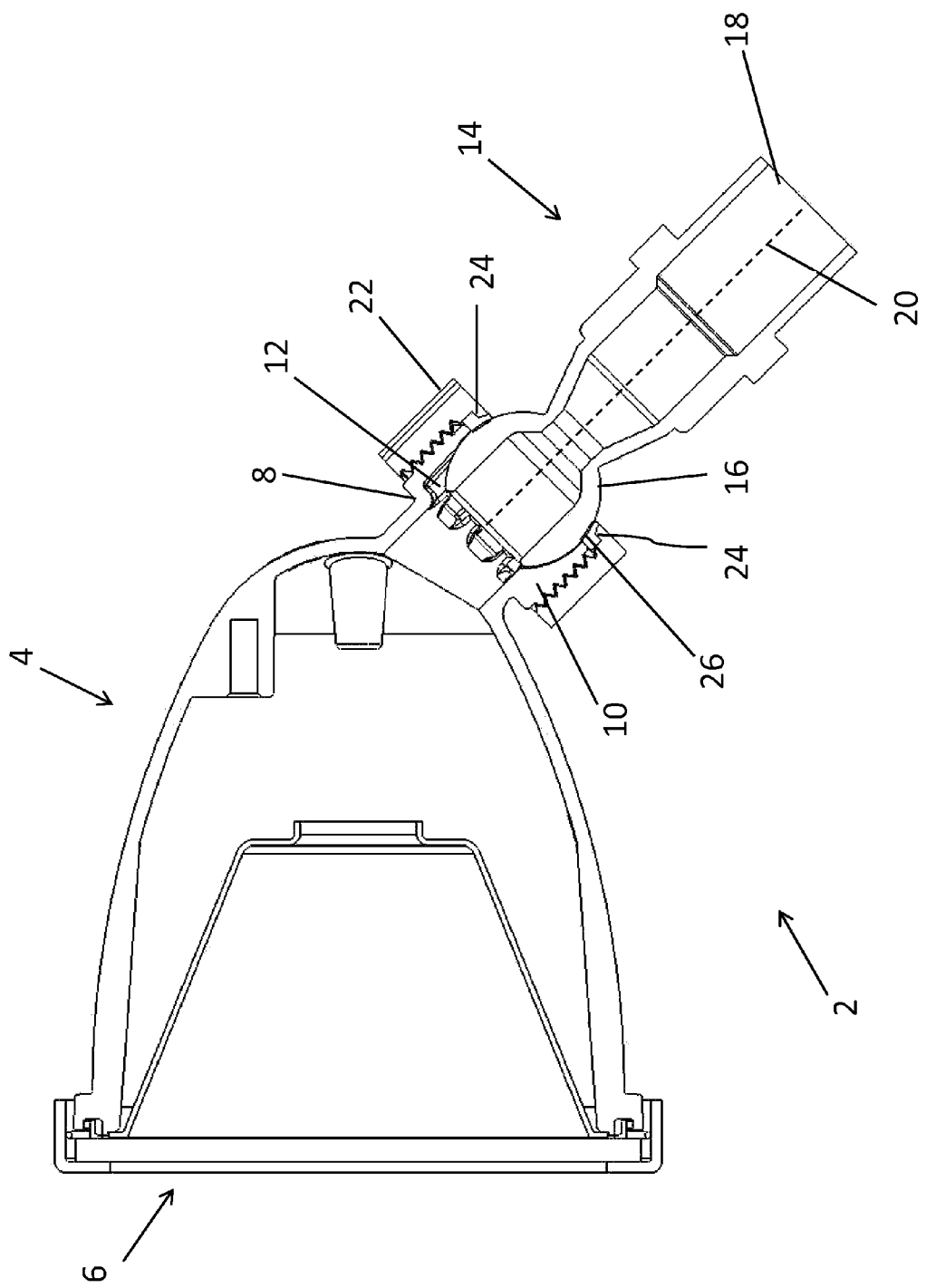
FIG. 1 is a cut-away side view of an outdoor swivel head spotlight as shown in FIG. 3.
Figure 2:
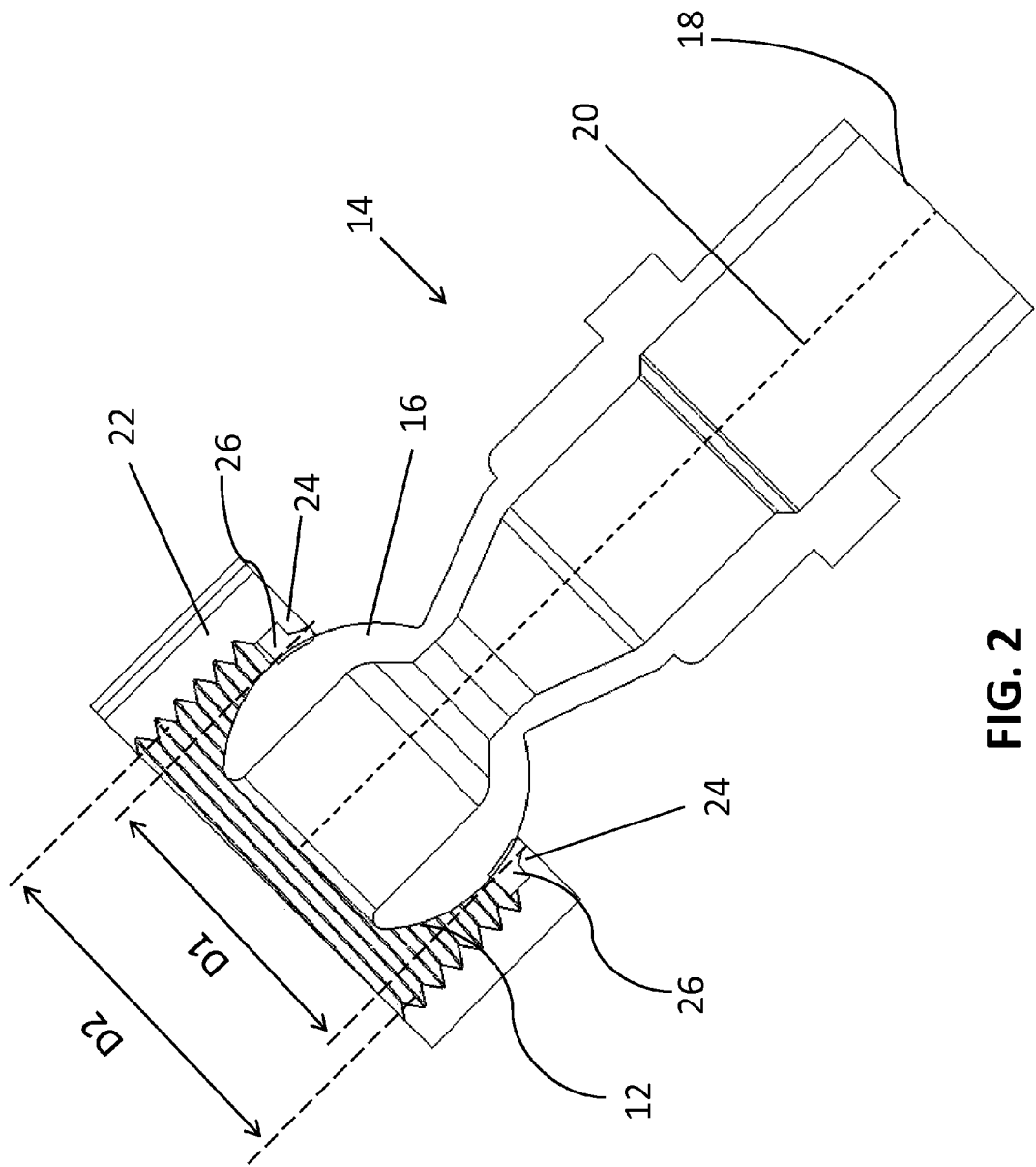
FIG. 2 is a cut-away close-up view of a support arm and nut of the outdoor swivel head spotlight of FIG. 3.
Figure 3:
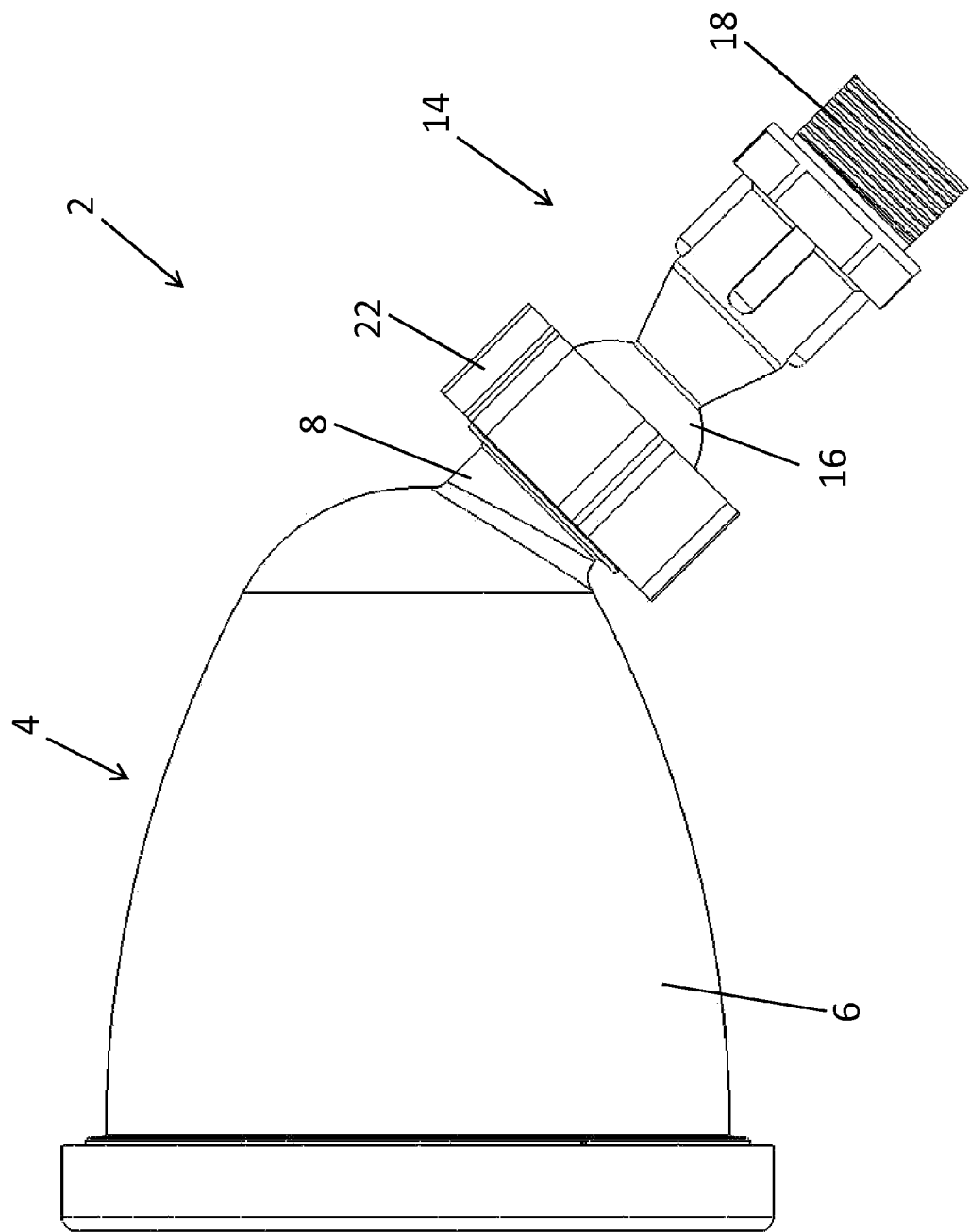
FIG. 3 is a side view of an outdoor swivel head spotlight.

There is a variety of possible outdoor spotlight implementations. Notwithstanding, FIGS. 1-3 illustrate various views of a particular implementation of an outdoor swivel head spotlight, and implementing components. Other implementations are illustrated by description throughout this disclosure. Spotlight 2 comprises light bulb hood 4 (which comprises reflector 6 and base 8). Reflector 6 may comprise any lighting reflector known in the art such as, by way of non-liming example, a parabolic reflector. Reflector 6 and base 8 are connected via an opening (obscured in the views provided), which allows electrical wires (not shown) to pass from base 8 into reflector 6. Base 8 comprises externally threaded spherical socket 10, which comprises internal seat 12. In particular implementations, internal seat 12 comprises at least a portion that is complementary to a sphere (specifically, in this implementation, at least a portion of internal seat 12 is complementary to spherical end 16, described below). Spotlight 2 further comprises support arm 14, which comprises spherical end 16 and a distal end 18 connected to spherical end 16 via through conduit 20, which extends through both spherical end 16 and distal end 18. In particular implementations, distal end 18 of support arm 14 is externally threaded and sized as a ½ inch coupling or a ¾ inch coupling. Wiring (not shown) extends through conduit 20 to provide power to a light bulb (not shown) within light bulb hood 4 during operation. The wiring extends to a conventional electrical junction box to obtain power for the light. Conventional electrical junction boxes, sometimes through a side wall and most often through a lid placed on the junction box, often comprise ½ inch or ¾ inch internally threaded couplings into which a threaded conduit may be threaded. Coupling of the distal end may be accomplished in a conventional manner. Notwithstanding, spherical end 16 is seated in internal seat 12 of externally threaded spherical socket 10. Again, at least a portion internal seat 12 is complementary to spherical end 16 so that at least a portion of internal seat 12 is in contact with, spherical end 16. Spherical end 16 comprises external spherical diameter D1 (FIG. 2). External spherical diameter D1 comprises the maximum distance between two antipodal points on the surface of the sphere.

Internally threaded nut 22 comprises open interior diameter D2 (FIG. 2). Lip 24 projects inwardly with respect to the outside surface of nut 22. Also, in particular implementations, the outside surface of nut 22 may comprise a grip or gripping feature, either configured as a hand grip or other tool grip such as a hexagonal outer shape. In describing the structure, as well as an exemplary method of assembling an outdoor spotlight having a swivel head, open interior diameter of lip 24 is greater than or substantially equal to external spherical diameter D1, which may allow nut 22 (specifically, the open interior diameter of lip 24) to be passed over external spherical diameter D1 of spherical end 16 without the requirement of first passing distal end 18 through nut 22. Those skilled in the art will appreciate the ease with which spotlight 2 may be assembled since nut 22 may be threadably coupled with externally threaded spherical socket 10 without having to first pass distal end 18 through nut 22. Washer 26 may also be passed over external spherical diameter D1 of spherical end 16 and be placed between spherical end 16 and lip 24. Washer 26 may, in particular implementations, comprise a compression washer or other like pliable and/or deformable component. Internally threaded nut 22 is threadably coupleable with externally threaded spherical socket 10, as is described in further detail below.

In one aspect, when nut 24 is in a loosened position (with respect to externally threaded spherical socket 10), light bulb hood 4 may be positioned along multiple axes by a user to a desired angular position. In another aspect, when nut 24 is in a tightened position (with respect to externally threaded spherical socket 10), washer 26 presses against spherical end 16 and presses spherical end 16 into internal seat 12 of externally threaded spherical socket 10 to fix the angular position of light bulb hood 4 with respect to support arm 14. Accordingly, an exemplary method of assembling an outdoor spotlight having a swivel head involves threadably coupling internally threaded nut 22 with externally threaded spherical socket 10 such that spherical end 16 of support arm 14 seats, or nestles, in externally threaded spherical socket 10 and washer 26 is positioned between spherical end 16 and inwardly projecting lip 24 of nut 22. Moreover, in describing one aspect of the co-operation of washer 26, spherical end 16 and lip 24, it will be understood that the communication of washer 26, spherical end 16 and lip 24 may provide resistance to weather elements as washer 26 is compressed between spherical end 16 and lip 24.

An exemplary method of adjusting an outdoor swivel head spotlight includes loosening nut 22 with respect to externally threaded spherical socket 10. With nut 22 in a loosened (or partially loosened) position, a user may further adjust light bulb hood 4 so that the hood is in a desired orientation. It will be understood that adjustment of light bulb hood 4 with respect to support arm 14 may occur along virtually any axis drawn between two antipodal points on the surface of spherical end 16 (and with the requirement of loosening only a single nut 22). Also, in particular implementations, light bulb hood 4 may be rotationally adjusted with respect to support arm 14. In addition, it will be understood that a user may also tighten nut 22 with respect to externally threaded spherical socket 10 in order to fix the multi-axis angular position of light bulb hood 4 with respect to the support arm 14 by compressing a washer 26 (seated in the spherical socket) between inwardly projecting lip 24 of nut 22 and spherical end 16 of support arm 14. Those skilled in the art will appreciate the ability to adjust and fix the multi-axis angular position of light bulb hood 4 with respect to support arm 14 with a single adjustment of a light bulb hood and the loosening and tightening of a single nut.

Many advantages are therefore made possible, either in combination or separately, from particular implementations of outdoor swivel head spotlights disclosed in the present application. Those advantages relate, among other things, to assembly, adjustment and fixing in position outdoor swivel head spotlights.

It will be understood that outdoor swivel head spotlight implementations are not limited to the specific parts, devices and components disclosed in this document, as virtually any parts, devices and components consistent with the intended operation of an outdoor swivel head spotlight implementation may be utilized. Accordingly, for example, although particular light bulb hoods, reflectors, bases, externally threaded spherical sockets, internal seats, support arms, spherical ends, external diameters, distal ends, through conduits, internally threaded nuts, inwardly projecting lips, open interior diameters, washers, grips, couplings, and other parts, devices and components are disclosed, such may comprise any shape, size, style, type, model, version, class, measurement, concentration, material, weight, quantity, and/or the like consistent with the intended operation of an outdoor swivel head spotlight implementation. Implementations are not limited to uses of any specific parts, devices and components; provided that the parts, devices and components selected are consistent with the intended operation of an outdoor swivel head spotlight implementation.

Implementations of an outdoor swivel head spotlight and implementing components may be constructed of a wide variety of materials. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as fiberglass), carbon-fiber, aramid-fiber, any combination thereof, and/or other like materials; composites and/or other like materials; natural and synthetic rubbers, elastomers or other like materials; metals, such as zinc, magnesium, titanium, copper, lead, iron, steel, carbon steel, alloy steel, tool steel, stainless steel, brass, tin, antimony, aluminum, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

Some components defining particular implementations of outdoor swivel head spotlights may be manufactured simultaneously and integrally joined with one another, while other components may be purchased pre-manufactured or manufactured separately and then assembled with the integral components. Various implementations may be manufactured using conventional procedures as added to and improved upon through the procedures described here. For the exemplary purposes of this disclosure, at least light bulb hood 4 and support arm 14 may be formed separately and then integrally joined together. Also, nut 22 and implementing components may be formed separately and then integrally joined with other components defining an outdoor swivel head spotlight implementation.

Accordingly, manufacture of these components separately or simultaneously may involve vacuum forming, injection molding, blow molding, casting, forging, cold rolling, milling, drilling, reaming, turning, grinding, stamping, pressing, cutting, bending, welding, soldering, hardening, riveting, punching, plating, and/or the like. Components manufactured separately may then be coupled or removably coupled with the other integral components in any manner, such as with adhesive, a weld joint, a solder joint, a fastener, washers, retainers, wrapping, wiring, any combination thereof, and/or the like for example, depending on, among other considerations, the particular material forming the components.

Contemplated implementations of an outdoor swivel head spotlight are many and can apply in many situations. While the specific implementations of an outdoor swivel head spotlight may initially be particularly useful in assisting the efficient and easy assembly, adjustment and fixing in a desired orientation of an outdoor swivel head spotlight, they also have many additional implementations in various other applications for which the desirability of the capabilities of the device described will become readily apparent from the present disclosure. The specific parts, devices and components discussed in this application in no way restrict any possible implementation of the principles here disclosed. Additionally, while particular examples of components may be described in this disclosure, these examples do not serve to limit in any way the potential types of components or reconfigurability that may be implemented. Those skilled in the art will be able with the principles here disclosed to create many potential implementations.

The invention claimed is:

1. An outdoor swivel head spotlight comprising:
a light bulb hood comprising a reflector and a base, the base comprising an externally threaded spherical socket having an internal seat, at least a portion of which is complementary to a sphere;
a support arm comprising a spherical end having an external diameter and a distal end connected to the spherical end by a through conduit extending through the spherical end, the spherical end seated in the internal seat of the externally threaded spherical socket;
an internally threaded nut comprising an inwardly projecting lip having an open interior diameter at least as large as the external diameter of the spherical end, the internally threaded nut threadably coupled with the externally threaded spherical socket;
a washer between the spherical end of the support arm and the inwardly projecting lip of the nut;
wherein, when the nut is in a loosened position, the light bulb hood is positionable to a desired angular position and when the nut is in a tightened position, the washer presses the spherical end into the internal seat to fix the angular position of the light bulb hood with respect to the support arm.

2. The outdoor swivel head spotlight of claim 1, the nut further comprising a grip on an outside surface of the nut.

3. The outdoor swivel head spotlight of claim 1, wherein the distal end of the support arm is externally threaded and sized as a ½ inch coupling or a ¾ inch coupling.

4. The outdoor swivel head spotlight of claim 1, wherein the washer is a compression washer.

5. A method of assembling an outdoor swivel head spotlight, the method comprising:
passing an inwardly projecting lip of an internally threaded nut over an external spherical diameter of a spherical end of a support arm for a swivel head light;
passing a washer over the external spherical diameter of the spherical end of the support arm for the swivel head light;
threadably coupling the internally threaded nut with an externally threaded spherical socket such that the spherical end of the support arm of the swivel head light seats in the spherical socket and the washer is positioned between the spherical end of the support arm and the inwardly projecting lip of the nut.

6. The method of claim 5, further comprising tightening the threaded coupling of the nut with the spherical socket and compressing the washer between the lip and the spherical end of the support arm.

7. The method of claim 6, wherein compressing the washer comprises providing a weatherproof seal.

8. A method of adjusting an outdoor swivel head spotlight, the method comprising:
loosening an internally threaded nut with respect to an externally threaded spherical socket of a swivel head light, in which a spherical end of a support arm of the swivel head light is seated;
adjusting a light bulb hood of the swivel head light so that the light bulb hood is in a desired orientation;
tightening the nut with respect to the externally threaded spherical socket;
fixing a multi-axis angular position of the light bulb hood with respect to the support arm by compressing a washer between an inwardly projecting lip of the internally threaded nut and the spherical end of the support arm seated in the spherical socket.

9. The method of claim 8, wherein compressing the washer comprises providing a weatherproof seal.

\* \* \* \* \*